Patented Mar. 28, 1944

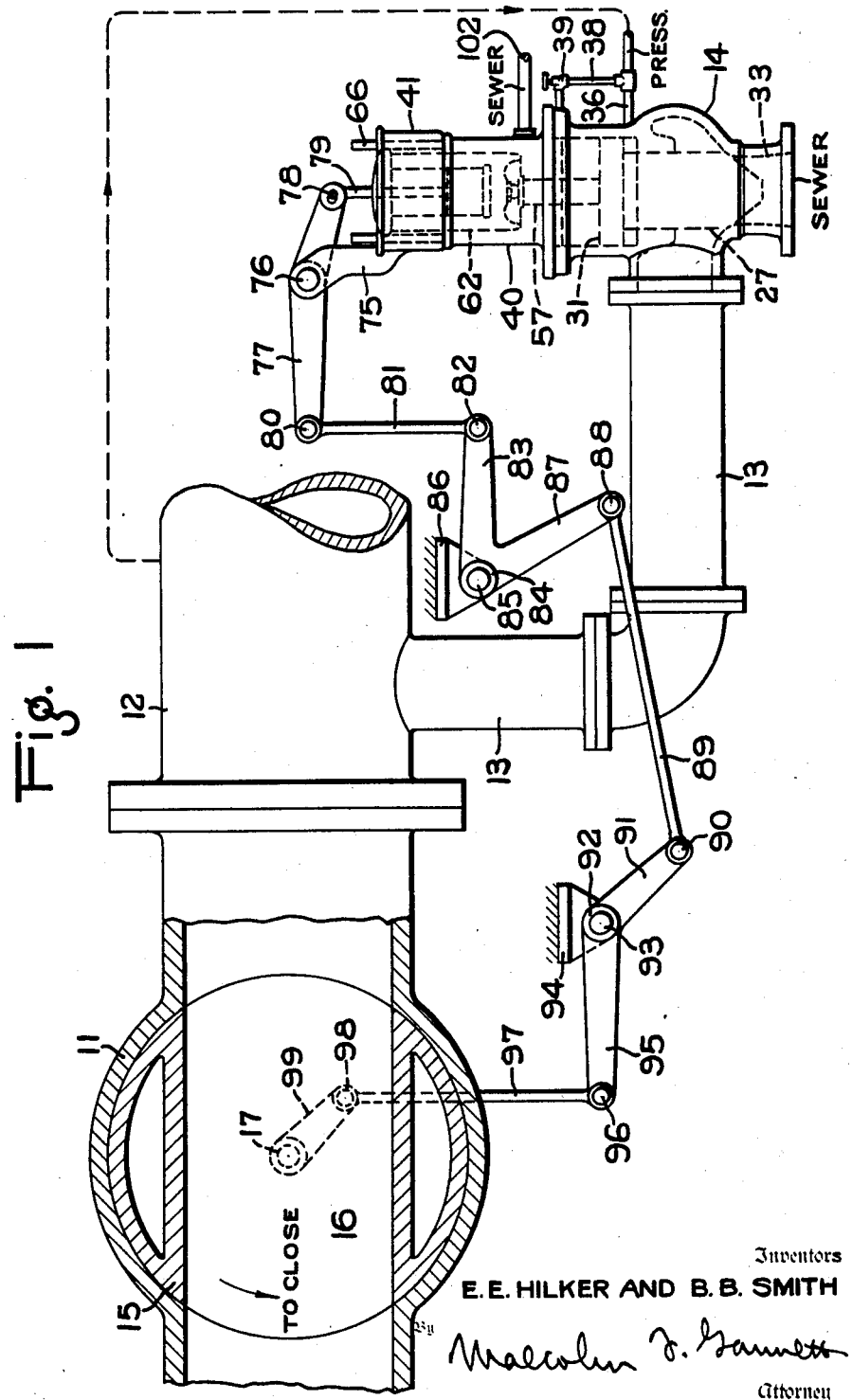

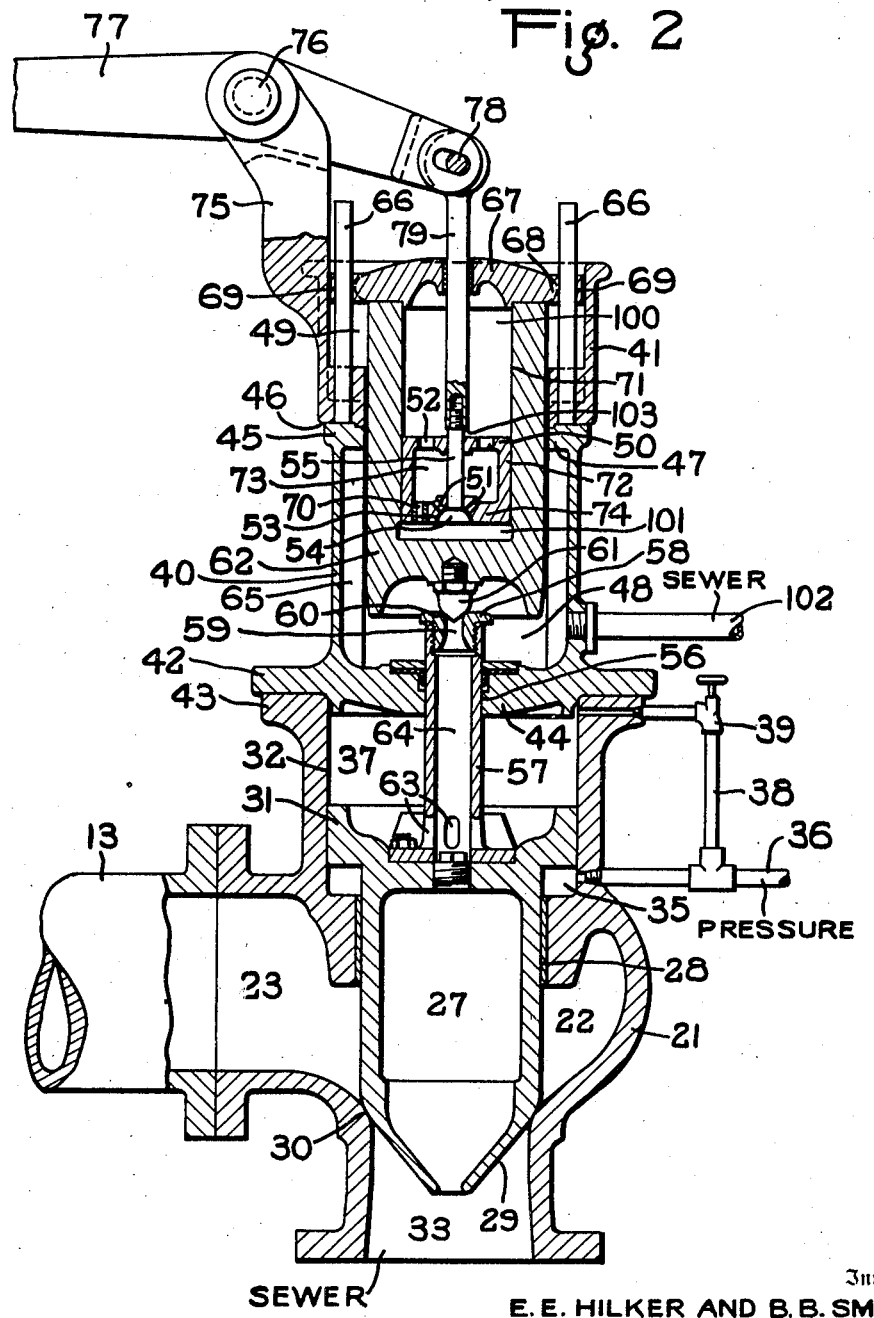

2,345,360

UNITED STATES PATENT OFFICE 2,345,360

CONTROL SYSTEM

Burwell B. Smith and Earl E. Hilker, York, Pa., assignors to S. Morgan Smith Company, York, Pa., a corporation of Pennsylvania Application October 14, 1942, Serial No. 461,962

11 Claims. (Cl. 137—78)

This invention relates to control systems, and more particularly to control systems for pipe lines of the type having a check valve on the discharge side of a pump.

The control system of the present invention is designed to protect the discharge line from a pumping station against excessive pressure rise caused by a rapid shut down of the pumping unit and a fast closure of the check valve. In such systems the check valve may be operated automatically according to variations in the pressure of the fluid. In other instances the check valve operating mechanism may be operatively connected with the pump in such a manner that the supply of electric current to the pump motor is also effective in controlling the automatic operation of the check valve. These systems by which the check valve is operatively associated with a pump are well known in the art and need no further explanation herein.

An object of the present invention is to provide an improved control system for a pipe line of the type having a check valve on the discharge side of a pump, in which a relief valve is connected to the pipe line at a point downstream with respect to the check valve, and in which there are means operatively connecting the relief valve with the check valve so that when the check valve is operated under predetermined normal conditions from open to closed position at a predetermined rate of speed the relief valve will not be operated to discharge fluid from the pipe line, and when the check valve is operated under abnormal conditions to cut off the flow of fluid in the pipe line at a rate faster than its normal closing rate, the relief valve will be operated so as to discharge fluid from the pipe line on the downstream side of the check valve.

Another object of the present invention is to provide an improved system for controlling the operation of a relief valve, in which the relief valve operating means is directly connected by mechanically operated mechanism to the shaft of the plug of a check valve.

Another object of the present invention is to provide an improved mechanically operated control system of the above type which is so arranged that the relief valve can be located adjacent to the check valve.

With the foregoing and other objects and advantages in view, the invention consists in the preferred construction and arrangement of the several parts which will be hereinafter fully described and claimed.

In the accompanying drawings—

Fig. 1 is a diagrammatic view partly in section of a control system for pipe lines embodying the present invention; and Fig. 2 is an enlarged vertical section of the relief valve shown in Fig. 1.

Referring to the drawings, and especially to Fig. 1, at a convenient point on the pressure side of a pump (not shown), the pipe line has installed therein an automatically operable check valve 11.

The check valve 11 may be of the type of power operated tapered plug valve shown in the following United States Letters Patents, namely #2,219,359, granted October 29, 1940, for Control system, invented by Laurence E. Goit and Eugene C. Brisbane; #2,220,327, granted November 5, 1940, for Control system, invented by Laurence E. Goit and Eugene C. Brisbane; and #2,232,901, granted February 25, 1941, for a Valve, invented by Eugene C. Brisbane.

Patents #2,219,359 and #2,220,327 each relate to a control system for the power operated mechanism of a valve installed in a pipe line on the pressure side of a motor driven pump, in which electromagnetically operated means are associated with the circuit supplying current to the pump motor so as to be responsive to line connections for said motor to control the operation of the valve mechanism.

In Patent #2,232,901 the check valve, which is located in the pipe line on the pressure side of a pump, has operating mechanism which is controlled in such a manner that under normal conditions the valve operating mechanism is controlled so as to effect closing of the valve plug in approximately forty seconds, while during closing operation of the valve plug under emergency or abnormal conditions, the average time to close the valve plug is approximately five seconds, or eight times faster than the normal closing rate.

When a valve plug is operated quickly to shut off communication through a pipe line, such as is described in Patent #2,232,901, an excessive pressure rise occurs in the pipe line on the downstream side of the valve. Since this excessive rise in fluid pressure is detrimental and often causes fracture or breaks in the pipe line, it is of advantage to provide some means for preventing the occurrence of these excessive increases in the pressure of the fluid.

According to the present invention, at some convenient point in the pipe line 12 on the downstream side of the check valve 11, a vent pipe 13 is connected to the pipe 12. In the instant case the vent pipe 13 is shown connected to the section of the pipe 12 directly abutting the downstream end of the valve 11. The reason the vent pipe 13 is so disposed in close relationship to the valve 11 is to enable a relief valve 14, which is connected to the outer end of the vent pipe 13, to be operatively connected by mechanically operated mechanism to the valve 11, as will be hereinafter more fully described.

The valve 11 may be of the type referred to in the above mentioned patents, and has a valve plug or gate 15 which is formed with a waterway 16 adapted to register with the bore of the pipe 12 when the plug is in the open position shown.

The plug or gate 15 is adapted to be rotated by suitable mechanism, as described in either one of the three patents above mentioned, which mechanism is not shown or described herein, since it is well known in the art. However, as a part of the valve operating mechanism, the plug 15 has a shaft 17 which extends beyond the valve casing a suitable distance, as shown in Patents #2,219,359 and #2,220,327.

The relief valve 14 comprises an elbow type of valve having a casing 21, formed with a chamber 22, which is connected by a passage 23 to the vent pipe 13 leading from the main pipe 12, so that said chamber 22 is always in communication with said main pipe, and fluid under pressure in the main pipe 12 is always present in valve chamber 22.

A piston valve 27 is mounted in a bore 28 formed in the body of the valve casing 21.

The piston valve 27 comprises a main body portion, which at one end is formed with a tapered portion 29 adapted to engage a seat 30 formed in the casing 21.

The end of the piston valve 27 opposite to the tapered portion 29, is formed with a head or piston 31 which is mounted in a cylinder 32.

The piston valve 27 is adapted to control communication from chamber 22 to a passage 33 adapted to be connected to a free discharge or sewer. If so desired the free discharge to which the passage 33 is adapted to be connected may be the suction well of the pump (not shown), as is well known in the art.

In order that the fluid can flow readily to the sewer when the relief valve 14 operates, the passages 23 and 33 are preferably formed of approximately the same diameter, as shown in Fig. 2.

The valve seat 30 is preferably formed at the upper end of passage 33 so that when the piston valve 27 is seated communication is shut off from chamber 22 to the sewer.

The chamber 35 on the lower side of the piston 31 is adapted to be supplied with pipe line fluid through a pipe connection 36.

Chamber 37 on the upper side of the piston 31 is also supplied with pipe line fluid from the pipe 36, through a branch pipe 38 having a valve 39 installed therein.

Preferably valve 39 is of the needle or other suitable form of valve adapted to provide an adjustable restricted orifice for regulating the rate at which fluid is admitted to the chamber 37 on the upper side of the piston 31.

As shown in Fig. 1, the connection or pipe 36 may be connected to the pipe line 12, preferably at the downstream side of the check valve 11.

Mounted on top of the casing 21 is a second cylinder composed of a lower section 40 and an upper section 41.

The lower section 40 of the second cylinder is formed with an outwardly extending flange 42 which rests on a flange 43 formed on the casing 21 at the top of cylinder 32. The lower section 40 also has a bottom 44 which forms a cover for the top of the cylinder 32.

The top of the lower section 40 of the second cylinder is formed with an outwardly extending flange 45 which supports the bottom 46 of the upper section 41.

The top of the lower section 40 is also formed with an inwardly extending flange 47 which constitutes a web for separating the chamber 48 within the lower section 40 from the chamber 49 within the upper section 41.

The bottom 44 is formed with a centrally disposed opening 56, through which extends a tubular stem 57.

The stem 57 is secured to the upper end of the piston valve 27 so that when the piston 31 moves upwardly and downwardly within the cylinder 32 the stem will be reciprocated.

The upper end of the tubular stem 57 terminates within the chamber 48 of the cylinder 40 at a point a suitable distance above the upper surface of the bottom 44, when the piston valve is in the seated position shown in Fig. 2.

A removable member 58 is mounted in the upper end of the tubular stem 57, said member 58 having a passage 59 extending centrally therethrough and terminating at its upper end in a seat 60 for a control valve 61 mounted on the lower portion of a valve body 62 disposed within the cylinder sections 40 and 41.

At its lower end the tubular stem 57 has a plurality of openings 63 formed therein so that the interior of said stem is in communication with the piston chamber 37.

When the valve 61 is seated against seat 60 fluid under pressure is bottled up in the piston chamber 37 and also in the chamber 64 within the tubular stem 57.

The valve body 62 is freely movable vertically within the cylinder sections 40 and 41.

For the purpose of guiding the valve body 62, within the cylinder section 40 are guides 65, and within the cylinder section 41 are guides 66.

The guides 65 are in the nature of ribs arranged around the wall of the interior of the cylinder section 40.

The top of the valve body 62 carries a cover or cap 67 having an outwardly extending flange 68, from which project diametrically disposed lugs, each of which is formed with an opening 69.

The guides 66 are in the form of rods which are mounted in the bottom of the upper cylinder section 41, pass through the openings 69, and extend upwardly above the top of said upper cylinder section so as to terminate at a suitable distance above the top thereof.

The valve body 62 is formed with a cylinder 71, the wall of said body being relatively thick so that the body 62 has considerable weight, for a purpose to be hereinafter described.

Mounted within the cylinder 71 is a piston 72, which, with the valve body 62, constitutes a dash pot device adapted to control the operation of the relief valve 27 in the manner to be hereinafter more fully described, said cylinder 71 containing a suitable quantity of fluid for controlling the movement of the piston 72 therein in well known manner.

Preferably the dash pot device should be of the type known as a differential dash pot. In such type of dash pot device, the piston 72 may be formed with a chamber 73 so that said piston has a lower wall 74 and an upper wall 50, which walls are connected by the usual side wall or skirt.

A series of openings 51 are formed in the lower wall 74 and a series of openings 52 are formed in the upper wall 50, the area of the openings 52 being somewhat larger than the area of the openings 51.

Also formed in the lower wall 74 and arranged in the manner shown in Fig. 2, centrally with respect to the openings 51, is a semispherical opening 53 adapted to receive a correspondingly formed head 54 of a plunger 55 arranged on the vertical longitudinal center line of the piston 72. The arrangement of the openings 51 with respect to the semispherical opening 53 is such that the plunger 55 with its head 54 seated against the seat provided by the opening 53 constitutes a valve for controlling communication through the openings 51.

Also formed in the piston 72 is a restricted orifice 70 through which the fluid in the cylinder 71 passes from one side of the piston to the other side thereof, when the piston is moved upwardly and downwardly in the cylinder 71.

The construction of the piston 72 and the plunger valve 54 is such that when the piston is moved upwardly the valve 54 is retained in position to cut off communication through the openings 51, and since the fluid can only pass through the small opening or orifice 70, the upward movement of the piston is retarded. On the other hand, when the valve plug 15 of the check valve 11 is turned from closed towards open position in the manner to be hereinafter described, the plunger valve 54 is moved away from the seat 53 so that communication is established through the series of openings 51, and since said openings 51 are somewhat larger as compared to the area of the orifice 70, the fluid flows readily through the piston openings 51, so that the resistance of the fluid on the piston is not as great as is the resistance thereon during the upward movement of the piston 72 in the cylinder 71, and consequently the piston travels downwardly within the cylinder 71 at a rate considerably faster than the rate of upward travel thereof.

Since the orifice 70 restricts the flow of fluid in the dash pot from one side of the piston 72 to the other side of said piston, when said piston is actuated rapidly in the direction upwardly of the cylinder 71, the fluid cannot flow through the orifice 70 at a rate sufficient to displace the piston, and, therefore, the piston is held by the fluid in the cylinder 71 with but slight relative movement between the piston and the cylinder. Consequently, since the piston 72 is thus not movable to any perceptible extent with respect to the valve body 62, the valve body 62 is also moved, in the same direction with the piston.

On the other hand, when the piston 72 is actuated at a predetermined slow rate of speed, the fluid within the dash pot cylinder 71 can pass through the orifice 70, and in doing so the piston will move within the cylinder 71 without affecting the position of the valve body 62.

Thus, summarizing the operation of the valve body 62 and the dash pot device therein, it will be noted that when forces are applied to move the piston with rapidity in an upward direction, the valve body 62 will also be moved, but when the actuating forces applied to the piston 72 to effect upward movement of said piston, move at a predetermined slow rate of speed, the piston 72 will move upwardly within the valve body cylinder 71 without affecting the relative position of said valve body.

Referring now to Fig. 1, the dash pot piston 72 is mechanically connected to the plug shaft 17 of the check valve 11 by suitable mechanism to be now described.

The upper cylinder section 41 carries a bracket 75 in which is mounted a pin 76, on which a lever 77 is pivoted to said bracket.

One end of the lever 77 is pivotally connected by a pin 78 to the upper end of a rod 79, the lower end of said rod being connected to the upper end of the plunger 55.

The other end of the lever 77 is pivotally connected by a pin 80 to one end of a link 81.

The other end of the link 81 is pivotally connected by a pin 82 to the end of one arm 83 of a bellcrank lever 84.

The bellcrank lever 84 is pivotally connected, as at 85, to a stationary bracket 86, and the other arm 87 of said bellcrank lever is pivotally connected by a pin 88 to one end of a link 89.

The other end of the link 89 is connected by a pin 90 to the end of one arm 91 of a second bellcrank lever 92.

The bellcrank lever 92 is pivotally connected, as at 93, to a stationary bracket 94, and the other arm 95 of said bellcrank lever 92 is pivotally connected by a pin 96 to one end of a link 97.

The other end of the link 97 is pivotally connected by a pin 98 to a crank 99 fixed to and extending from the valve plug shaft 17.

The plunger 55 is threadedly connected to the lower end of the rod 79 so that when the parts of the apparatus are in the position shown in Fig. 2, the head 54 will engage the seat provided by the wall of the opening 53. Shoulder 103 at the lower end of the rod 79 will thus be disposed in spaced relation to the upper surface of the dash pot piston 72. This construction is such that the plunger 55 has a limited amount of free movement within the piston, so that the head 54 can be moved away from the seat 53 during initial movement downwardly of the rod 79 to thereby establish communication through the piston 72 from the chamber on the lower side of said piston to the chamber on the upper side thereof before the shoulder 103 on said rod 79 engages the top of the piston 72 to move the piston downwardly in the manner and for the purpose to be hereinafter more fully described.

In operation, when the check valve plug 15 is turned at a predetermined normal or slow rate of speed in the direction of the arrow, Fig. 1, from open to closed position, which rotative movement of said valve plug is through an angle of approximately 90 degrees, the crank or arm 99, on the end of the plug shaft 17 will also be turned through a corresponding angle, and during such movement, the piston 72 of the dash pot, will be pulled by the lever 77 and rod 79 upwardly within the cylinder 71, and since this upward piston movement within the cylinder 71 is slow the fluid in the chamber 100 on the upper side of said piston will pass through the restricted orifice 70 in the piston to the chamber 101 on the lower side of the piston 72 in well known manner so that the valve body 62 will not be displaced, and the valve 61 will remain against the seat 60.

Thus, any time the valve plug 15 is moved from open towards closed position at its normal or slow turning rate of speed, the relief valve 14 will remain inactive.

On the other hand, when the valve plug 15 is actuated and turned from the open position shown in Fig. 1 towards closed position at a fast rate of speed, as has heretofore been referred to, the dash pot piston 72 is actuated by its operating mechanism, including the links and levers heretofore described, in such a manner that, due to the resistance of the fluid within cylinder 71, the piston 72 pulls the valve body 62 upwardly, and in doing so the valve 61 uncovers the port or passage 59.

The instant valve 61 is unseated from the seat 60, fluid under pressure in piston chamber 37 is vented to the sewer through openings 63, chamber 64 within the tubular stem 57, past unseated valve 61, chamber 48, and through vent pipe 102. The pressure of the fluid supplied to piston chamber 35 from pipe 36, acting on the bottom of piston 31, causes the piston valve 27 to move rapidly upwardly away from the seat 30, thereby connecting chamber 22 with the free discharge provided by passage 33. Although the piston valve 27 moves rapidly upwardly, since the valve body 62 also moves rapidly upwardly at the same time, valve 61 will remain unseated from seat 60.

The upward movement of the piston valve 27 away from seat 30 results in a quick discharge of fluid under pressure from the pipe 12, through vent pipe 13, passage 23, chamber 22, and passage 33, so that the pressure of the fluid in the pipe 12 is quickly reduced.

When the piston valve 27 has completed its upward movement in the manner above described, the weighted cylinder or valve body 62 of the dash pot device gradually forces fluid through the orifices 70 of the dash pot piston 72, thereby permitting the valve body 62 to move downwardly with respect to the dash pot piston 72 so that valve 61 engages seat 60 and thus closes the passage 59.

With the valve 61 thus closed, pressure of fluid in piston chamber 37 builds up at a rate determined by the setting of valve 39 in pipe 38. In actual practice the rate at which the fluid is supplied to piston chamber 37 is relatively slow so that the piston valve will be moved down towards the seat 30 very slowly, thereby gradually closing the communication from the pipe 12 to the free discharge provided by passage 33.

The rate of closure of the piston valve 27 is also dependent on the amount of fluid which flows through the restricted orifice 70 of the dash pot piston 72. Consequently, with the rate of closure of the relief valve dependent on the size of the orifice 70 of the dash pot and the size of the orifice through the needle valve 39, surges and hammering in the pipe 12 will be reduced to a minimum.

When the check valve plug 15 is in closed position and the piston valve 27 returns to its seat 30 and the valve body 62 of the dash pot device also descends in the manner heretofore described so that the valve 61 is seated against seat 60, since the dash pot piston 72 is connected to the plug shaft 17 of the check valve 11, by the links and levers heretofore described, the dash pot piston 72 will remain in a position at the upper end of cylinder 71.

Now, when it is desired to rotate the valve plug 15 from closed towards open position, during the turning movement of said valve plug 15, the crank 99 is actuated by the plug shaft 17 in a clockwise direction, or in the direction opposite to the direction of the arrow, Fig. 1.

When the valve plug 15 is in closed position the end of the lever 77 to which the piston rod 79 is connected is elevated a distance above the pivot 76 equal approximately to the distance the pin 78 is disposed below a horizontal line passing through the pivot pin 76 when the parts are in the position shown in Fig. 2.

Consequently, when the crank 99 is turned during the opening movement of the valve plug 15, the piston rod 79 is moved downwardly by its leverage mechanism heretofore described, until shoulder 103 abuts the upper surface of the wall 50 of the dash pot piston 72. This downward movement of the piston rod 79 does not immediately produce an appreciable corresponding movement of the dash pot piston 72, due to the fact that the fluid in chamber 101 cannot pass rapidly through the orifice 70 in the dash pot piston, and since plunger 55 is operatively connected to piston rod 79, the plunger 55 will be moved downwardly by said piston rod with respect to the piston 72 so that valve head 54 uncovers the openings 51 in the piston 72. With communication thus established through the piston 72, which communication provides a passage for the fluid which is somewhat larger in area than the area of the restricted orifice 70, the fluid in chamber 101 flows readily through the piston openings 51 so that the resistance of the fluid on the piston is not great and consequently the piston 72 travels downwardly within the cylinder 71 at a rate equal substantially to the turning movement of the valve plug 15.

In this way the parts are returned to their respective positions shown in Figs. 1 and 2, and the controls are set in position for repeating their operation heretofore described.

While we have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described our invention, what we claim is:

1. In a control system of the type described, the combination with a main pipe having a check valve therein, said check valve having a gate for controlling the flow of fluid therethrough, of a relief valve connected to the main pipe and having a discharge port and a valve for controlling communication through said discharge port, an operating piston attached to said relief valve, said piston having differential areas subject to fluid pressure and so arranged that the relief valve is normally held closed by pressure acting on its larger area, means for controlling the operation of said relief valve including a valve element for controlling the pressure acting on the larger area of the piston and means for operating said valve element, said valve element being arranged to establish a communication from the piston chamber of larger area to a free discharge so that the pressure acting on the side of said piston of larger area is relieved thereby effecting operation of said relief valve to establish communication from the main pipe through said discharge port so as to exhaust fluid under pressure in said main pipe, and means for operatively connecting said valve element operating means with said check valve gate, said operating means being ineffective to operate the valve element to relieve the pressure acting on said larger area of the relief valve piston when the check valve gate is operated from open towards closed position at less than a predetermined rate, said operating means being effective to operate the valve element when the check valve gate is operated at a rate greater than the predetermined rate.

2. In a control system of the type described, the combination with a main pipe having a check valve therein, said check valve having a gate for controlling the flow of fluid therethrough, of a relief valve connected to the main pipe and having a discharge port and a valve for controlling communication through said discharge port, an operating piston attached to said relief valve, said piston having differential areas subject to fluid pressure and so arranged that the relief valve is normally held closed by pressure acting on its larger area, a dash pot device having a valve element for controlling the pressure acting on the larger area of the relief valve piston, said valve element being arranged to establish communication from the piston chamber of larger area to a free discharge so that the pressure acting on the side of said piston of larger area is relieved thereby effecting operation of said relief valve to establish communication from the main pipe through said discharge port so as to exhaust fluid under pressure in said main pipe, and means operatively connecting said dash pot device with said check valve gate, said dash pot device being ineffective to operate said valve element to relieve the pressure acting on said larger area of the relief valve piston when the check valve gate is operated from open towards closed position at less than a predetermined rate, said dash pot device being effective to operate the valve element when the check valve gate is operated at a rate greater than the predetermined rate.

3. In a control system of the type described, the combination with a main pipe having a check valve therein, said check valve having a gate for controling the flow of fluid therethrough, of a relief valve connected to the main pipe and having a discharge port and a valve for controlling communication through said discharge port, an operating piston attached to said relief valve, said piston having differential areas subject to fluid pressure and so arranged that the relief valve is normally held closed by pressure acting on its larger area, means for controlling the pressure acting on the larger area of the piston including a dash pot device having a combined weighted body and valve element, said valve element being arranged to establish communication from the piston chamber of larger area to a free discharge so that the pressure acting on the side of said piston of larger area is relieved thereby effecting operation of said relief valve to establish communication from the main pipe through said discharge port so as to exhaust fluid under pressure in said main pipe, said weighted body having a cylinder formed therein, a dash pot piston mounted within the cylinder of said weighted body, said dash pot piston being constructed and arranged so as to move independently of said weighted body when actuated at less than a predetermined rate, said dash pot piston being arranged to move the weighted body and valve element therewith when operated at a rate greater than the predetermined rate so as to establish communication by which the pressure acting on said larger area of said relief valve piston is relieved, and means operatively connecting said dash pot piston with said check valve gate whereby the dash pot piston is operated by the check valve gate when the check valve gate is operated, said weighted body and dash pot piston being arranged to move said valve element to closed position when the check valve gate has completed its closing movement.

4. In a control system of the type described, the combination with a main pipe having a check valve therein, said check valve having a gate for controlling the flow of fluid therethrough, of a relief valve connected to the main pipe and having a discharge port and a valve for controlling communication through said discharge port, an operating piston attached to said relief valve, said piston having differential areas subject to fluid pressure and so arranged that the relief valve is normally held closed by pressure acting on its larger area, means for controlling the pressure acting on the larger area of the piston including a dash pot device having a combined body and valve element, said valve element being arranged to establish communication from the chamber on the side of said piston of larger area to a free discharge so that the pressure acting on the side of said piston of larger area is relieved thereby effecting operation of said relief valve to establish communication from the main pipe through said discharge port so as to exhaust fluid under pressure in said main pipe, said dash pot body having a cylinder formed therein, a dash pot piston mounted within the cylinder of said body, said dash pot piston being constructed and arranged so as to move independently of said dash pot body when actuated at less than a predetermined rate, said dash pot piston being arranged to move the dash pot body and the valve element therewith when operated at a rate greater than the predetermined rate so as to establish communication by which the pressure acting on the larger area of said relief valve piston is relieved, and means operatively connecting said dash pot piston with said check valve gate whereby the dash pot piston is operated by the check valve gate when said gate is operated.

5. In a control system of the type described, the combination with a main pipe having a check valve therein, said check valve having a gate for controlling the flow of fluid therethrough, of a relief valve connected to the main pipe and having a discharge port and a valve for controlling communication through said discharge port, an operating piston attached to said relief valve, said piston being subject to fluid pressure in chambers at the opposite sides thereof having differential areas, said piston being so arranged that the relief valve is normally held closed by pressure acting on its larger area, means for supplying fluid under pressure to said piston chambers, means including a port through which fluid in the chamber on the side of the piston of larger area can be relieved, the chamber on the side of the piston of smaller area having fluid under pressure for operating the piston when the pressure is relieved from the piston chamber of larger area to move the piston so as to unseat the relief valve and thereby establish communication through said discharge port, means for controlling the pressure acting on the larger area of said piston including a dash pot device having a combined weighted body and valve element for controlling communication through said exhaust port of said piston chamber of larger area, a dash pot piston mounted within a cylinder within said weighted body, said dash pot piston being constructed and arranged within said weighted body so that when operating forces are applied to said dash pot piston to move the dash pot piston upwardly at less than a predetermined rate the weighted body will remain inoperative and the dash pot piston will move upwardly therein, and when operating forces are applied to said dash pot piston to move the same at a rate greater than the predetermined rate, the weighted body will be carried along upwardly with said dash pot piston, thereby unseating said valve element and establishing communication through the exhaust port so that pressure is relieved from the relief valve piston chamber of larger area so as to effect operation of said relief valve to open said discharge port, and means connecting said dash pot piston with said check valve gate whereby operation of said gate imparts rectilinear movements to said dash pot piston.

6. The combination with a main pipe having a main valve therein for controlling the flow of fluid therethrough, said main valve having a gate, a relief valve connected to the main pipe and having a discharge port and a valve for controlling communication through said discharge port, an operating piston attached to said relief valve, said piston having differential areas subject to fluid pressure and so arranged that the relief valve is normally held closed by pressure acting on its larger area, means for controlling the pressure acting on the larger area of the piston including a dash pot device having a valve element for controlling communication from the side of said relief valve piston of larger area to a free discharge, and means operatively connecting said dash pot device with said main valve gate whereby said dash pot device is operated by said gate, said dash pot device being arranged to retain its valve element closed when the main valve gate is operated from open towards closed position at less than a predetermined rate and being arranged to operate its valve element to establish communication from the side of said relief valve piston of larger area with the free discharge when the main valve gate is operated from open towards closed position at a rate greater than the predetermined rate.

7. The combination with a main pipe having a main valve therein for controlling the flow of fluid therethrough, said main valve having a gate, a relief valve connected to the main pipe and having a discharge port and a valve for controlling communication through said discharge port, an operating piston attached to said relief valve, said piston having differential areas subject to fluid pressure and so arranged that the relief valve is normally held closed by pressure acting on its larger area, means for controlling the operation of said piston, and means operatively connecting said piston controlling means with said main valve gate, said piston controlling means being arranged to keep the pressure bottled up on the side of said piston of larger area when the main valve gate is operated at less than a predetermined rate and being arranged to operate so as to relieve the pressure acting on the side of said piston of larger area when the main valve gate is operated from open towards closed position at a rate greater than the predetermined rate.

8. In control system of the type described, the combination with a main pipe having a check valve therein for automatically controlling the flow of fluid therethrough, said check valve having a rotatable plug constructed and arranged to be operated normally from open to closed position at less than a predetermined rate, a pressure relief valve connected to the pipe and having a discharge port and a valve for controlling communication through said discharge port, said valve closing said discharge port when the check valve plug is in open position, said relief valve having an operating piston attached thereto, said piston being mounted in a cylinder and having differential areas, means for supplying the piston chambers with fluid under pressure, the relief valve being held by said piston in a position closing said discharge port when fluid pressure is applied to both the upper and the lower sides of the piston by pressure in the upper piston chamber, the relief valve being operated to an open position establishing communication through said discharge port when fluid is exhausted from the upper piston chamber of larger area, a port through which fluid in said upper piston chamber is adapted to be exhausted, means for controlling the pressure acting on the larger side of said piston including a dash pot device having a combined weighted body and valve element for controlling communication through the exhaust port of said upper piston chamber, a dash pot piston mounted within a cylinder in the weighted body, means operatively connecting said dash pot piston with said check valve plug and including a piston rod having a shoulder normally arranged in spaced relation to said dash pot piston, said dash pot piston being arranged within the weighted body at a point adjacent to the bottom of the dash pot cylinder when the valve plug is in open position, said operating means being constructed and arranged to move the dash pot piston independently of said weighted body and without affecting the position of the valve of said weighted body closing the exhaust port of said relief valve piston chamber when the valve plug is operated from open towards closed position at less than a predetermined rate, said operating means being constructed and arranged to move the dash pot piston together with the weighted body and its valve rectilinearly in one direction to uncover the exhaust port of said relief valve piston chamber without shifting substantially the position of the dash pot piston with respect to the weighted body when the valve plug is turned from open towards closed position at a rate greater than the predetermined rate, means for supplying fluid under pressure to said upper chamber of said relief valve piston at a restricted rate insufficient to counteract the pressure of the operating fluid in the chamber on the lower side of said relief valve piston when the weighted body and its valve are in raised position, the weighted body being constructed and arranged to move rectilinearly in the opposite direction independently of said dash pot piston at the completion of the closing movement of said valve plug so that its valve can engage the exhaust port of the upper chamber of said relief valve piston and thereby permit operating fluid at the restricted rate to build up in said upper chamber of the relief valve piston so as to restore said relief valve to its original position cutting off communication through said discharge port, said operating means being constructed and arranged to move the piston rod at the initiation of an opening movement of the valve plug so that the shoulder on said piston rod engages the dash pot piston to thus move the dash pot piston with respect to the weighted body and thereby return said dash pot piston to its original position at the bottom of the weighted body cylinder.

9. The combination with a pipe having a valve therein, said valve having a rotatable plug for controlling communication therethrough, a pressure relief valve connected to the pipe and having a discharge port and a valve for controlling communication through said discharge port, an operating piston attached to said relief valve, said piston having differential areas subject to fluid pressure and so arranged that the relief valve is normally held closed by pressure acting on its larger area, a dash pot device having a weighted body, a dash pot piston mounted within a cylinder in the weighted body, means including a valve element carried by said weighted body for controlling the pressure acting on the larger area of said relief valve piston, said valve element being arranged to establish communication from the side of said relief valve piston of larger area to a free discharge so that the pressure acting on the side of said relief valve piston of larger area is relieved thereby effecting operation of said relief valve to establish communication from the main pipe through said discharge port so as to exhaust fluid under pressure in said main pipe, means operatively connecting said dash pot piston with said valve plug and including a piston rod having a shoulder normally arranged in spaced relation to said dash pot piston, said dash pot piston being arranged within the weighted body at a point adjacent the bottom of the dash pot cylinder when the valve plug is in open position, said operating means being constructed and arranged to move the dash pot piston independently of said weighted body and without affecting the position of said weighted body and its valve element when the valve plug is operated from open to closed position at less than a predetermined rate, said operating means being constructed and arranged to move the dash pot piston together with the weighted body and its valve element rectilinearly in one direction without shifting substantially the position of the dash pot piston with respect to the weighted body when the valve plug is turned from open to closed position at a rate greater than said predetermined rate, the weighted body being constructed and arranged to move rectilinearly in the opposite direction independently of said dash pot piston at the completion of the closing movement of said valve plug to thereby seat the valve element and cut off the free discharge of pressure from the side of said relief valve piston of larger area, and the operating means being constructed and arranged to move the piston rod at the initiation of an opening movement of the valve plug so that the shoulder on said piston rod engages the dash pot piston to thereby move the dash pot piston with respect to the weighted body and thus return said dash pot piston to its original position at the bottom of the weighted body cylinder.

10. The combination with a main pipe line having a check valve therein for automatically controlling the flow of fluid therethrough, said check valve having a rotatable valve plug, said valve plug having a shaft, a crank fixed to said plug shaft and rotatable therewith, a vent pipe leading from said main pipe line, a pressure relief valve comprising a casing having a chamber arranged to be directly connected to said vent pipe, a valve mounted in said chamber for controlling communication from the chamber to a discharge port, an operating piston attached to said relief valve, said piston being mounted in a cylinder and having chambers of differential areas so that the relief valve is normally held closed by pressure of fluid in the larger chamber acting on its larger area, a passage for providing communication between the chamber of smaller area on the lower side of said piston and said main pipe, a tubular stem carried by said piston and extending through a wall at the top of said cylinder on the side of said piston of larger area, a passage providing communication between the chamber in said cylinder on the side of said piston of larger area and said main pipe, an opening formed in said tubular stem for providing a communication between the piston chamber of larger area and the interior of said stem, a second cylinder disposed above the relief valve piston cylinder, a dash pot device disposed within said second cylinder and comprising a weighted valve body having a cylinder formed therein, a valve seat formed at the upper end of said tubular stem, said valve seat being disposed within said second cylinder, a control valve carried by said weighted body for engaging said tubular stem valve seat to bottle up the operating fluid in the piston chamber of larger area, a dash pot piston mounted in said weighted body cylinder, said dash pot piston being arranged within its cylinder so that movement of the dash pot piston in one direction with respect to the weighted body is retarded with respect to the movement of said dash pot piston in the opposite direction with respect to the weighted body, said dash pot piston being constructed and arranged to operate within the weighted body at less than a predetermined rate without affecting the position of the control valve seated against the seat of said tubular stem, said dash pot piston being constructed and arranged when operated at a rate greater than the predetermined rate to move the weighted valve body and the control valve carried thereby upwardly to thereby establish communication between the side of said relief valve piston of larger area and a free discharge, said dash pot piston having a plunger valve device for controlling the flow of dash pot fluid therethrough, a piston rod connected to said plunger valve device and having a limited vertical movement with respect to said dash pot piston, and means operatively connecting said piston rod to the crank of said valve plug whereby rotary movements imparted to said crank are transmitted to said piston rod to effect operation of said dash pot device.

11. In a control system of the type described, the combination with a main pipe having a check valve therein, said check valve having a gate for controlling the flow of fluid therethrough, of a relief valve connected to the main pipe and having a discharge port and a valve for controlling communication through said discharge port, an operating piston attached to said relief valve, said piston being subject to fluid pressure in chambers at the opposite sides thereof having differential areas, said piston being so arranged that the relief valve is normally held closed by the fluid pressure in the chamber of larger area, means for supplying fluid under pressure to said piston chambers, the chamber on the side of the piston of smaller area having fluid under pressure for operating the piston when the pressure is relieved from the piston chamber of larger area to move the piston so as to unseat the relief valve and thereby establish communication through said discharge port, a cylinder arranged in superposed relation to the relief valve piston chambers and having a bottom wall between it and the chamber of larger area on the upper side of said piston, an opening formed in said bottom wall, a tubular stem carried by said piston and extending upwardly through the bottom wall opening and terminating within said upper cylinder, ports connecting the chamber on the upper side of said piston with the interior of said tubular stem, a free discharge means connected to said upper cylinder through which pressure fluid from said chamber having the larger area piston is adapted to be relieved, a dash pot device mounted within said upper cylinder, said dash pot device comprising a weighted valve body having a control valve for engaging the valve seat on the upper end of said tubular stem to cut off communication therethrough, means to restrict the supply of pressure fluid to the chamber having the larger area piston when the control valve of said weighted body is unseated from said valve seat, a cylinder formed within said weighted valve body, a dash pot piston mounted within said weighted valve body cylinder and movable rectilinearly in fluid therein, means carried by said dash pot piston for controlling the movement thereof with respect to said weighted valve body so that movement of the dash pot piston in one direction with respect to the weighted valve body is retarded with respect to the movement of said dash pot piston in the opposite direction with respect to the weighted valve body, said dash pot piston being constructed and arranged to operate within the weighted valve body at a predetermined rate in said one direction without affecting the position of the weighted valve body in said upper cylinder, said dash pot piston being constructed and arranged when operated at a rate greater than the predetermined rate in said one direction to move the weighted valve body and the control valve carried thereby upwardly to thereby establish communication between the chamber having the larger area piston and the free discharge whereby the pressure fluid in the chamber having the larger area piston is relieved through said free discharge and said relief valve piston is operated by the differential pressures acting on it to open the discharge port of said relief valve, and means connecting said dash pot piston to said main valve gate whereby operating movements imparted to said gate impart rectilinear movements to said dash pot piston, the said one direction of movement of the dash pot piston corresponding to closing movement of said check valve gate.

BURWELL B. SMITH.
EARL E. HILKER.